United States Patent Office 3,778,280
Patented Dec. 11, 1973

3,778,280
PAINTS AND COATINGS
Werner Dittrich, Herten, Baden, Germany, assignor to Dynamit Nobel AG, Troisdorf, Germany
No Drawing. Continuation of abandoned application Ser. No. 101,136, Dec. 23, 1970. This application June 30, 1972, Ser. No. 267,821
Claims priority, application Germany, Jan. 3, 1970, P 20 00 199.4
Int. Cl. C09d 5/10
U.S. Cl. 106—1       7 Claims

ABSTRACT OF THE DISCLOSURE

Galvanic action coating material having improved properties comprising a pigment, such as zinc dust, lithopone, iron oxides, titanium dioxide or cadmium sulfide, and a bonding agent comprising an alkyl silicate in which there has been incorporated a trialkyl, preferably triethyl, phosphate.

---

This is a continuation of application Ser. No. 101,136, filed Dec. 23, 1970, now abandoned.

This invention relates to paints and other surface coatings. It more particularly refers to such surface coatings which exert a galvanic action on the substrate being coated. More specifically, it refers to zinc dust paints for coating of metallic and nonmetallic surfaces.

Surface coatings, particularly paints, which exert a galvanic action on the surface of the substrate being coated are well known. The pigments used in this type of surface coating are illustrated and exemplified by zinc dust, lithopone, iron oxides, titanium dioxide and cadmium sulfide.

It is known (see U.S. Pat. 3,056,684 or French Pat. 1,491,093) to utilize as a binding agent for these pigments, compositions based upon alkyl silicates. While these binding agents do the job, that is, they bond together the particulate pigment, the compositions containing such often fail to give satisfactory results in that the coating has insufficient strength of adhesion and insufficient resistance to checking (mud cracking). Further, it has been found that such known alkyl silicate binding agents have less than desirable shelf life.

It is therefore an object of this invention to provide a novel binding agent for this type of use.

It is another object of this invention to provide a novel paint or surface coating composition.

Other and additional objects will become apparent from a consideration of this entire specification, including the claims hereof.

In accord with and fulfilling these objects, one aspect of this invention resides in a novel binding agent for zinc dust and related pigments which comprises an alkyl silicate and a trialkyl phosphate, the latter being present in a proportion of about 0.1 to 30 weight percent, based upon the total binding agent weight.

Another, and preferred, aspect of this invention envisions the utilization of triethyl phosphate as the trialkyl phosphate and utilizing such in a preferred proportion of 5 to 15 weight percent based on the total weight of binding agent.

It is within the broad scope of this invention to utilize as the alkyl silicate those compounds and oligomers which have up to about 10 carbon atoms in the alkyl chain or chains. These alkyl silicates are esters of orthosilicic acid and/or of condensed silicic acids. The number of silicon atoms per molecule preferably averages about 2 to 10. Illustrative of these alkyl groups are ethyl, n-propyl, i-propyl, 2-ethylhexyl, etc. While methyl groups are considered to be within the scope of this invention, it is suggested that situations be avoided which will generate methanol by hydrolysis of one or more of the components of the binding agent composition.

It is within the broad scope of this invention to utilize as the alkyl phosphate those compounds and oligomers which have up to about 10 carbon atoms in the alkyl chain or chains. These alkyl phosphates are esters of orthophosphoric acid. Illustrative of these alkyl groups are ethyl, n-propyl, i-propyl, 2-ethylhexyl, etc. While methyl phosphites have a surface toxicity it is not recommended to use this compound, although it has the same effect as the other alkyl phosphites.

In both of the above cases, the alkyl groups may be substituted by various straight chain ethers of comparable chain length such as various ethers of ethylene glycol, propylene glycol and mixtures thereof generally known as Cellosolves and/or Carbitols. These ethers may have chain lengths of three or seven atoms, e.g., ethylene glycol or dipropylene glycol, etc.

The addition of trialkyl phosphate to the binding agent in zinc dust or other similar paints produces better strength of adhesion of the paint to a ferrous or other substrate surface, e.g. concretes.

The well-known undesirable phenomenon of checking ("mud-cracking") in such zinc dust paints, which has previously only been reduced or eliminated only by the addition of relatively large amounts of fillers of a mineral nature, such as talc, asbestos, mica, etc., substantially never occurs when trialkyl phosphate is incorporated in the binding agent.

Furthermore, when trialkyl phosphate is used in the binding agent, a substantial improvement in the stability of the binding agent in storage (shelf life) is achieved, especially at elevated temperatures.

It is within the scope of this invention to utilize other and additional components in the binding agent composition. These additional materials are per se known in the alkyl silicate binding agent art. They include ethers of polyvalent alcohols or mixtures thereof, alkyl acetates or dioxan and possibly hydrolysis adjuvants such as diluted hydrochloric acid or the like. The alkyl acetates, for example, may be methyl, ethyl or propyl, and may be used in a proportion of about 1 to 50% by weight, based upon the entire weight of bonding agent. The ethers of polyvalent alcohols may be various Cellosolves or Carbitols which are preferably used in proportion of about 1 to 50% by weight, based upon the weight of the entire binding agent.

The binding agent composition of this invention is suitably prepared by conventional procedures as known and used prior to this invention; that is, the same technique is used to produce binding agent with or without alkyl phosphate. The alkyl phosphate may be added to the alkyl silicate composition before or after partial hydrolysis thereof.

The following examples illustrate the practice of this invention and reflect the improvements obtained by its practice.

EXAMPLE 1

To prepare the binding agent, a mixture of 282 weight parts of ethylene glycol monoethyl ether, 64 weight parts of one percent hydrochloric acid and 114 weight parts of triethylphosphate are added with constant stirring to 540 weight parts of ethyl polysilicate containing 40% $SiO_2$, corresponding to an average chain length of 4.63 Si atoms per molecule. The reaction temperature is maintained at 25° C. by appropriate cooling. The silicic acid content of the reaction mixture amounts to 21.6%.

The shelf life of this product so produced at 70° C. amounts to 3 months. To prepare a zinc dust paint, one weight part of the binding agent is mixed with 4.5 weight parts of zinc dust suitable for paint use with constant stirring. The zinc dust is composed of 92 weight percent finely divided zinc dust of a grain size of 0.1 to 30 microns, the average grain size being 6 microns, and two weight percent each of finely divided chromic oxide, microtalc, micronized asbestos and finely ground mica. The pot life of the paint is 8 to 10 hours at a temperature of 22° C. The paint can be applied in 20 to 200 micron thick coats to an iron surface that has been derusted, usually by sandblasting.

It dries in a 75 micron thick coating in 15 minutes under ambient conditions: relative humidity of 65% and temperature of 22° C. to such an extent that it is not harmed by water spray. After another 90 minutes of aging it has a hardness corresponding to lead pencil hardness H. After a total of 24 hours' aging, the paint has hardened to the extent that no significant impression is made in it with the "Erichsen" hardness testing bar at a load of 300 g. The costs are entirely free of checking in all thicknesses after completion of hardening.

The strength of the adhesion of the dried paint averages 20 kp./cm.$^2$ for a 65-micron coating on a sandblasted iron surface.

EXAMPLE 2

For comparative reasons

An entirely analogous binding agent prepared in the same manner as that set forth in Example 1 but containing isopropanol instead of triethyl phosphate, had a shelf life at 70° C. of a little longer than one month. A paint can be prepared with a zinc dust and applied as previously described in a weight ratio of 1:4.5 and should be used in thicknesses of less than 50 microns. The strength of adherence of this dried paint amounts to about 10.9 kp./cm.$^2$ in a thickness of 65 microns applied on previously sandblasted iron.

EXAMPLE 3

A partially hydrolyzed solution is prepared by mixing together 120 weight parts of tetraethyl orthosilicate, 20 weight parts of ethylene glycol monobutyl ether, 20 weight parts of ethylene glycol monoethyl ether, 20 weight parts of triethyl phosphate, 2 weight parts of acetic acid ethyl ester and 18 weight parts of 0.5% hydrochloric acid. The reaction temperature is limited to 25° C. by cooling. The silicic acid content of this partially hydrolyzed solution amounts to 17.3%. The shelf life at 70° C. is more than 3 months.

This partially hydrolyzed solution serves as a binding agent for zinc dust paints which are prepared with a zinc dust as described in Example 1 in a ratio of 1 part binding agent to 4.5 parts zinc dust. The pot life of the paint is 10 hours at a temperature of 22° C. The paint can be applied in coats 20 to 200 microns thick. The drying and hardening are the same as with the paint described in Example 1. The paint hardens in the coat thicknesses stated, without any checking. The strength of adhesion of the paint to sandblasted iron is determined to be 20 kp./cm.$^2$.

EXAMPLE 4

For comparative reasons

An entirely analogous binding agent that was prepared in the same manner as the one described in Example 3, but contained isopropanol instead of triethyl phosphate, had a shelf life at 70° C. which amounted to six weeks. The strength of adhesion of this paint on sandblasted iron amounts to 14 kp./cm.$^2$.

EXAMPLE 5

500 weight parts of an alkyl silicate of the average composition $$Si_5O_4(OR_1)_9(OR_2)_3$$

wherein $R_1 = C_2H_5-$ and $R_2 = CH_3CH_2OCH_2CH_2-$ are mixed with 90 weight parts triethylphosphate, 55 weight parts 1% hydrochloric acid, 145 weight parts ethylene glycol monobutyl ether and 210 weight parts ethylene glycol monoethyl ether, with constant stirring. The temperature, which rises during the reaction, is limited by appropriate cooling to 25° C. The $SiO_2$ content of the mixture is 17.1%. The shelf-life of this binder is equivalent to that of Example 1.

The solution serves as a binding agent for zinc dust paints which are prepared with a zinc dust described in Example 1 in a ratio of 1 part binding agent to 4.5 parts by weight of zinc dust. The quality of the coating obtained with this binding agent is equivalent to the ones described in Examples 1 and 3.

What is claimed is:

1. In a galvanic action coating composition essentially of a pigment selected from the group consisting of the zinc dust, lithopone, iron oxide, titanium dioxide, chromium oxide, cadmium sulfide, a binding agent for said pigment consisting essentially of a pre-hydrolyzed alkyl silicate and a solvent; the improvement comprising maintaining in said composition a trialkyl phosphate to maintain storage stability of said binder and improve strength of adhesion of said coating composition to a substrate, said trialkyl phosphate having alkyl groups each of which contains between 1 and 10 carbon atoms in the chain.

2. The improved coating material claimed in claim 1 wherein said alkyl silicate has up to about 10 carbon atoms in the alkyl group and wherein said phosphate is triethyl phosphate.

3. The improved coating material claimed in claim 2 wherein said triethyl phosphate comprises 5 to 15 weight percent of said binding agent.

4. The improved coating material claimed in claim 1 further including hydrochloric acid.

5. The improved coating material according to claim 1 wherein said phosphate is triethyl phosphate.

6. An improved coating material according to claim 1 wherein said phosphate is present in a proportion of 0.1 to 30 weight percent based upon the total binding agent weight.

7. A galvanic action coating material according to claim 6 wherein the solvent is an ether of a polyvalent alcohol, an alkyl acetal of $C_1-C_3$ carbon atoms or dioxan, said trialkyl phosphate being present in an amount between 0.1 and 30 weight percent based upon the total weight of the alkyl silicate, trialkyl phosphate, ether of polyvalent alcohol, alkyl acetate or dioxan.

References Cited

UNITED STATES PATENTS

| | | | |
|---|---|---|---|
| 2,644,761 | 7/1953 | McGirr | 106—177 |
| 3,392,036 | 7/1968 | McLeod | 106—1 |
| 3,392,130 | 7/1968 | Rucker et al. | 106—14 |

FOREIGN PATENTS

| | | | |
|---|---|---|---|
| 652,136 | 4/1951 | Great Britain | 106—14 |

LORENZO B. HAYES, Primary Examiner

U.S. Cl. X.R.

106—14, 287 SE; 117—135.1, 131

UNITED STATES PATENT OFFICE
CERTIFICATE OF CORRECTION

Patent No. 3,778,280     Dated December 11, 1973

Inventor(s) WERNER DITTRICH

It is certified that error appears in the above-identified patent and that said Letters Patent are hereby corrected as shown below:

Column 1, in the heading, change "Herten, Baden" to -- Herten/Baden --.

Signed and sealed this 29th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,778,280　　　　　　　　Dated December 11, 1973

Inventor(s) WERNER DITTRICH

It is certified that error appears in the above-identified patent and that said Letters Patent are hereby corrected as shown below:

Column 1, in the heading, change "Herten, Baden" to -- Herten/Baden --;

line 70, "1-propyl" should read -- iso-propyl --.

Column 4, lines 34-35, delete "wherein said alkyl silicate has up to about 10 carbon atoms in the alkyl group and".

Signed and sealed this 4th day of March 1975.

(SEAL)
Attest:

RUTH C. MASON
Attesting Officer

C. MARSHALL DANN
Commissioner of Patents
and Trademarks